(12) United States Patent
Kim

(10) Patent No.: US 12,294,807 B2
(45) Date of Patent: May 6, 2025

(54) A/V RECEIVING APPARATUS AND WIRELESS DISPLAY SYSTEM

(71) Applicant: LG ELECTRONICS INC., Seoul (KR)

(72) Inventor: Dongsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/551,580

(22) PCT Filed: Jun. 28, 2021

(86) PCT No.: PCT/KR2021/008123
§ 371 (c)(1),
(2) Date: Sep. 20, 2023

(87) PCT Pub. No.: WO2023/277205
PCT Pub. Date: Jan. 5, 2023

(65) Prior Publication Data
US 2024/0171699 A1    May 23, 2024

(51) Int. Cl.
*H04N 5/445* (2011.01)
*H04N 5/57* (2006.01)

(52) U.S. Cl.
CPC ........... *H04N 5/44504* (2013.01); *H04N 5/57* (2013.01)

(58) Field of Classification Search
CPC .... H04N 5/44504; H04N 5/57; H04N 21/436; H04N 21/43615; H04N 21/4363; H04N 21/43637; H04N 21/4854; H04N 5/445; H04N 21/485; G09G 5/006
See application file for complete search history.

(56) References Cited

U.S. PATENT DOCUMENTS

| | | | |
|---|---|---|---|
| 7,362,381 B1* | 4/2008 | Stahl | H04N 21/43615 348/706 |
| 2004/0130625 A1* | 7/2004 | Imamura | H04N 17/02 348/184 |
| 2005/0200922 A1* | 9/2005 | Ueno | H04N 5/44504 358/518 |
| 2006/0092188 A1* | 5/2006 | Mamba | G09G 5/005 345/698 |
| 2009/0146941 A1* | 6/2009 | Fujine | H04N 21/4316 345/102 |
| 2011/0032272 A1* | 2/2011 | Noritake | H04N 21/4884 345/629 |

(Continued)

FOREIGN PATENT DOCUMENTS

| KR | 100679455 | 2/2007 |
|---|---|---|
| KR | 100821750 | 4/2008 |

(Continued)

OTHER PUBLICATIONS

PCT International Application No. PCT/KR2021/008123, International Search Report dated Mar. 21, 2022, 2 pages.

*Primary Examiner* — Michael Lee
(74) *Attorney, Agent, or Firm* — LEE, HONG, DEGERMAN, KANG & WAIMEY

(57) ABSTRACT

An object of the present disclosure may improve compression and restoration capabilities by compensating for or removing a change in picture quality that occurs when a transmitting device transmits a video including an OSD (On Screen Display) in a wireless display system.

15 Claims, 11 Drawing Sheets

(56) References Cited

U.S. PATENT DOCUMENTS

| | | | | |
|---|---|---|---|---|
| 2011/0285818 A1* | 11/2011 | Park | ................ | H04N 13/161 |
| | | | | 348/43 |
| 2012/0127371 A1* | 5/2012 | Watanabe | ................ | H04N 5/57 |
| | | | | 345/589 |
| 2018/0191997 A1 | 7/2018 | Oh et al. | | |
| 2022/0279143 A1* | 9/2022 | Gong | ................ | H04N 5/44504 |

FOREIGN PATENT DOCUMENTS

| KR | 100896498 | 5/2009 |
|---|---|---|
| KR | 101461033 | 11/2014 |
| KR | 101565620 | 11/2015 |
| KR | 101978222 | 5/2019 |

* cited by examiner

A/V RECEIVING APPARATUS AND WIRELESS DISPLAY SYSTEM

CROSS-REFERENCE TO RELATED APPLICATION(S)

This application is the National Stage filing under 35 U.S.C. 371 of International Application No. PCT/KR2021/008123, filed on Jun. 28, 2021, the contents of which are all incorporated by reference herein in its entirety.

TECHNICAL FIELD

The present disclosure relates to a wireless display system for wirelessly transmitting and receiving A/V data.

BACKGROUND ART

As video technology changes from analog to digital, development has been made from SD (Standard-Definition) to HD (Hi-Definition) to provide videos closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality video compared to SD.

Recent video technology is growing one step further to Ultra High-Definition (UHD) beyond Full HD. UHD, which supports high picture quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher picture quality than the HD.

Recently, a wireless display system that wirelessly transmits such a high-resolution video to a display device has emerged.

The wireless display system is a system for transmitting and receiving A/V data between an A/V transmitting device and an A/V receiving device through a local area network.

The A/V receiving device displays A/V data received from the A/V transmitting device.

Conventionally, when there is no OSD in a specific video pattern (pattern that includes high-frequency signals as a whole), there is no difference in picture quality due to the change in the entire video when compression and restoration are performed, but when there is an OSD, there is a difference in picture quality between the area with only video signal and the area where the OSD overlaps.

That is, the area where the video signal and OSD overlap is compressed and restored differently due to the difference in frequency component and output to the screen, and the brightness and gray level difference between the area where only the video signal is displayed and the area where the video signal and OSD signal overlap will occur.

This difference, from the user's point of view, becomes an element that interfere with viewing.

DISCLOSURE

Technical Problem

An object of the present disclosure is to improve compression and restoration capabilities by compensating for or removing a change in picture quality that occurs when a transmitting device transmits a video including an OSD (On Screen Display) in a wireless display system.

In a wireless display system, when a transmitting device transmits a video including an OSD (On Screen Display), the difference of the picture quality between a first region in which a content video and an OSD video are overlapped and a second region in which only the content video is displayed is to eliminate.

Technical Solution

An A (Audio)/V (Video) receiving device according to an embodiment of the present disclosure may comprise: a display: a RF receiving module configured to receive a compressed Radio Frequency (RF) packet from an A/V transmitting de vice, wherein the compressed RF packet includes a video signal corresponding to a content video. OSD (On Screen Display), and OSD information; and a microcomputer configured to: based on the OSD information, obtain a picture quality value information including a first picture quality value of an OSD area where the OSD is displayed and a second picture quality value of a content video area where only the content video is displayed is obtained, transmit the picture quality value information to the A/V transmitting device, receive a picture quality correction value in which the first picture quality value of the OSD area is corrected from the A/V transmitting device, and output the content video and the OSD through the display based on the received picture quality correction value.

A wireless display system according to an embodiment of the present disclosure may comprise: An A/V (Audio/Video) transmitting device configured to: generate an RF packet, compress the generated RF packet, and transmit the compressed RF packet to an A/V receiving device through a RF communication, wherein the compressed RF packet includes a video signal corresponding to the content video, On Screen Display (OSD) and OSD information; and the A/V receiving device configured to: based on the OSD information, obtain a picture quality value information including a first picture quality value of an OSD area where the OSD is displayed and a second picture quality value of a content video area where only the content video is displayed is obtained, transmit the picture quality value information to the A/V transmitting device, receive a picture quality correction value in which the first picture quality value of the OSD area is corrected from the A/V transmitting device, and output the content video and the OSD through the display based on the received picture quality correction value.

Advantageous Effects

According to an embodiment of the present disclosure, since there is no difference in picture quality between the OSD area and the content video area, even if there is an OSD, a video of consistent picture quality can be provided.

In addition, according to this, the user may not be disturbed in viewing the video regardless of the presence or absence of the OSD.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specification meaning or function.

A video/audio (hereinafter, A/V) transmitting device according to an embodiment of the present disclosure is, for example, an intelligent device in which a computer support function is added to a broadcast reception function. The A/V transmitting device may perform the Internet function in addition to the broadcast reception function and may be equipped with a more user-friendly interface such as a handwritten input device, a touch screen or a spatial remote control device.

In addition, the A/V transmitting device may be connected to the Internet and a computer with the support of a wired or wireless Internet function and therefore, also perform functions such as e-mail, web browsing, banking, or games. A standardized general-purpose OS may be used for these various functions.

Accordingly, in the A/V transmitting device described in the present disclosure, for example, various applications may be freely added or deleted on a general-purpose OS kernel, so that various user-friendly functions may be performed.

Figure 1:
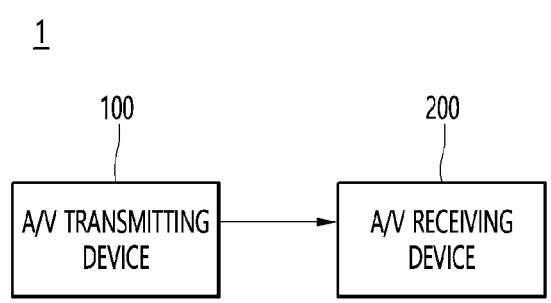
FIGS. 1 and 2 are diagrams for describing a configuration of a display system according to an embodiment of the present disclosure.
Figure 2:
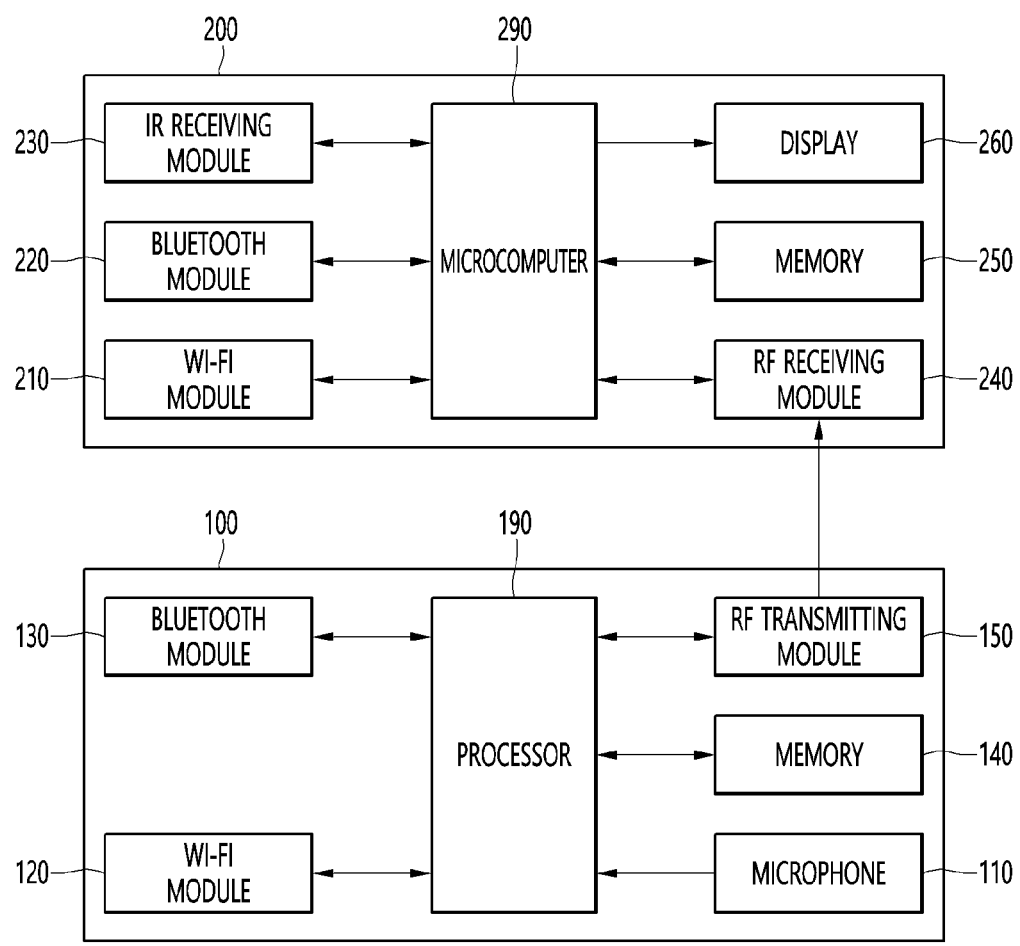

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding video and audio and transmitting the encoded content video and audio in a wireless manner.

The A/V transmitting device 100 may be a set-top box.

The A/V transmitting device 100 may be connected to an external device such as a set-top box or a USB memory. The A/V transmitting device 100 may transmit a video signal or an audio signal received from the connected external device to the A/V receiving device 200.

The A/V receiving device 200 may be a display device capable of wirelessly receiving an encoded video and audio and decoding the received video and audio.

The A/V transmitting device 100 and the A/V receiving device 200 may constitute a video wall display system.

In a video wall, a display having a thin bezel plays an important role in the visualization of content videos. For a thin bezel of a display, it is efficient that components capable of minimal functions are only provided and a circuit or a component for a main function is provided in a separate device.

The A/V transmitting device 100 may determine a type of the content video input from the outside and determine a compression radio of the content video based on the determined type. The compression ratio of the content video may be defined as a ratio between the size of video data before encoding and the size of video data after encoding.

The type of the content video may include a still video type, a general video type, and a game video type.

The A/V transmitting device 100 may compress the content video according to the determined compression ratio, and wirelessly transmit the compressed content video to the A/V receiving device 200.

The A/V receiving device 200 may restore the compressed content video received from the A/V transmitting device 100 and display the restored content video on the display.

FIG. 2 is a block diagram illustrating detailed configurations of the A/V transmitting device 100 and the A/V receiving device 200.

Referring to FIG. 2, the A/V transmitting device 100 may include a microphone 110, a Wi-Fi module 120, a Bluetooth module 130, a memory 140, an RF transmitting module 150 and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Wi-Fi module 120 may perform wireless communication with an external device or the A/V receiving device 200 through the Wi-Fi standard.

The Bluetooth module 130 may perform wireless communication through a Bluetooth Low Energy (BLE) standard.

The Bluetooth module 130 may perform wireless communication with an external device such as a remote control device or the A/V receiving device 200 through a Bluetooth Low Energy (BLE) standard.

The memory 140 may store a program for signal processing and control and store a signal-processed video, audio, or data signal.

The memory 140 may perform a function for temporarily storing video, audio, or data signals input from the outside, and store information on a predetermined video through a channel storage function.

The RF transmitting module 150 may transmit an A/V signal to the RF receiving module 240 of the A/V receiving device 200 through radio frequency (RF) communication.

The RF transmitting module 150 may include one or more antennas.

The RF transmitting module 150 may transmit a compressed A/V signal in a digital form to the RF receiving module 240.

The RF transmitting module 150 may transmit an A/V signal to the RF receiving module 240 through one or more channels.

The processor 190 may control overall operation of the A/V transmitting device 100. The processor 110 may be configured in the form of a system on chip (SoC).

A plurality of processors 190 may be provided.

The processor 190 may compress a video signal or an audio signal input from the outside, and transmit the compressed signal to the RF transmitting module 150.

The processor 190 may include an encoder for compressing a video signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving device 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmitting device 100 through a Wi-Fi standard.

The Bluetooth module 130 may perform wireless communication through a Bluetooth Low Energy (BLE) standard.

The Bluetooth module 130 may perform wireless communication with an external device such as a remote control device or the A/V transmitting device 100 through a Bluetooth Low Energy (BLE) standard.

The IR module 230 may receive a signal from the remote control device 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed video, audio, or data signal.

The display 260 may display a video signal received from the microcomputer 290.

The display 260 may display the video signal according to driving of a timing controller (not shown).

The microcomputer 290 may control the overall operation of the A/V receiving device 200.

The microcomputer 290 may restore the compressed A/V signal received by the RF receiving module 240. To this end, the microcomputer 290 may include a decoder.

Figure 3:
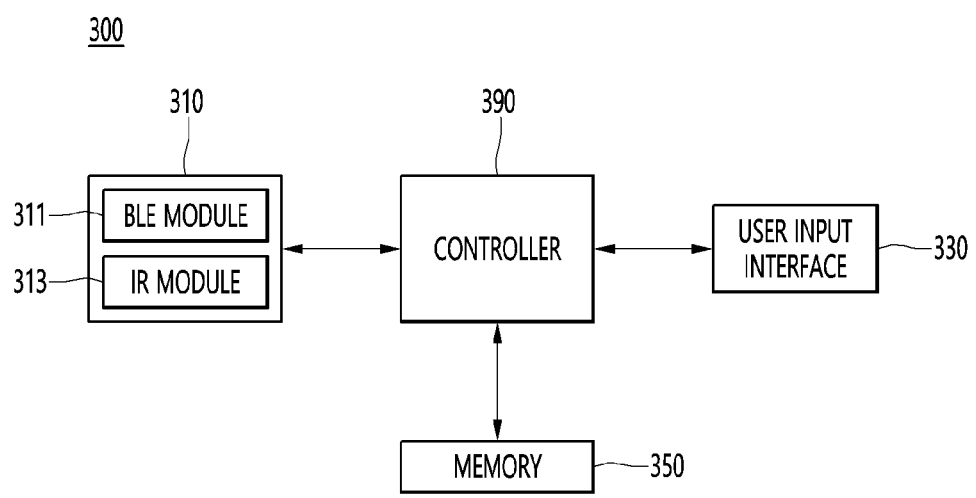
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an IR (Infra-Red) module 313.

The BLE module 311 may transmit a signal for controlling the operation of the A/V transmitting device 100 to the A/V transmitting device 100.

The BLE module 311 may transmit a signal for triggering a pairing operation of the A/V transmitting device 100 to the A/V transmitting device 100.

The user input interface 330 may include a keypad, a button, a touch pad, a touch screen, or the like.

The user input interface 330 may generate a control command for controlling the operation of the A/V transmitting device 100 or the A/V receiving device 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
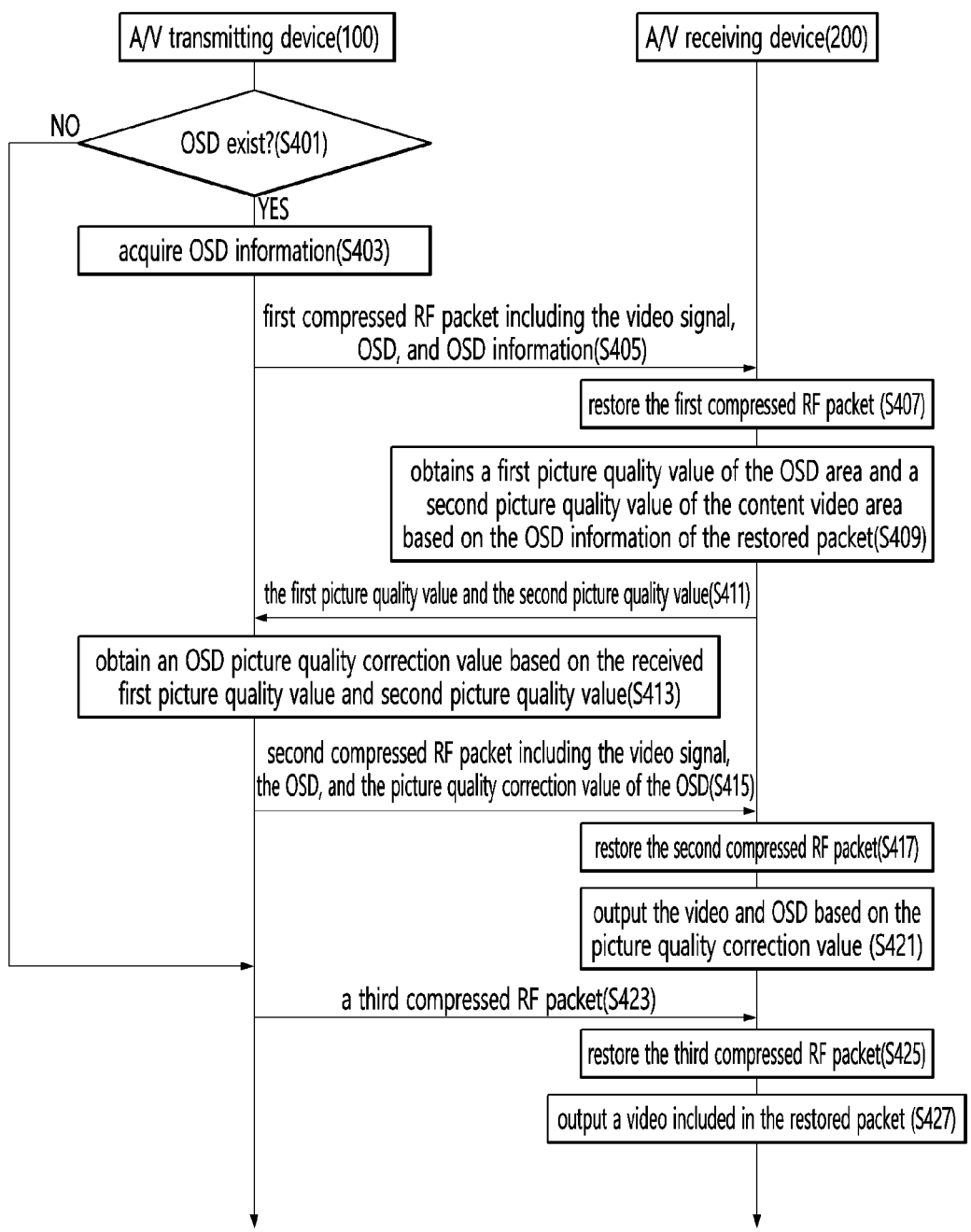
FIG. 4 is a ladder diagram for explaining a method of operating a wireless display system according to an embodiment of the present disclosure.

FIG. 4 is a ladder diagram for explaining a method of operating a wireless display system according to an embodiment of the present disclosure.

Referring to FIG. 4, the processor 190 of the A/V transmitting device 100 determines whether an OSD exists in an input video (S401).

In one embodiment, the A/V transmitting device 100 may further include an OSD generator (not shown). When the OSD is generated through the OSD generator, the processor 190 may determine that the OSD exists in the input video.

In another embodiment, the processor 190 may receive an OSD identifier indicating that an OSD is included in an externally input video from an external device. The processor 190 may determine that the OSD exists in the video input through the OSD identifier.

The processor 190 of the A/V transmitting device 100 acquires OSD information when OSD exists in the video (S403).

The OSD information may include location information indicating a location where the OSD will be displayed on the display 260. The location information of the OSD may include coordinate at which the OSD is to be displayed.

The processor 190 of the A/V transmitting device 100 compresses the video signal, OSD, and OSD information, and transmits the first compressed RF packet to the A/V receiving device 200 through the RF transmitting module 150 (S405).

The encoder of the processor 190 may compress the video signal and OSD together with OSD information to generate a first compressed RF packet.

The microcomputer 290 of the A/V receiving device 200 restores the first compressed RF packet received from the A/V transmitting device 100 (S407).

The decoder of the microcomputer 290 may restore the first compressed RF packet.

The microcomputer 290 of the A/V receiving device 200 obtains a first picture quality value of the OSD area and a second picture quality value of the content video area other than the OSD area based on the OSD information of the restored packet (S409).

The first picture quality value of the OSD area may indicate the value of the picture quality factor of the area where the OSD is displayed.

The remaining area other than the OSD area may be a content video area in which only content videos are displayed.

The second picture quality value of the remaining area may represent a picture quality factor value measured in the remaining area other than the OSD area.

The quality factor may be any one of luminance, brightness, and gradation.

The microcomputer 290 may measure a brightness value or gradation value of an OSD area where the OSD is displayed among the entire area of the display 260 based on OSD location information included in the OSD information.

In addition, the microcomputer 290 may measure brightness value or gradation value of the remaining areas other than the OSD area.

The microcomputer 290 of the A/V receiving device 200 transmits the first picture quality value and the second picture quality value to the A/V transmitting device 100 through the RF receiving module 240 (S411).

In an embodiment, the microcomputer 290 may calculate a difference between the first picture quality value and the second picture quality value.

The microcomputer 290 may transmit the first picture quality value and the second picture quality value to the A/V transmitting device 100 when the difference between the first picture quality value and the second picture quality value is greater than or equal to a preset difference.

If the difference between the first picture quality value and the second picture quality value is less than a preset difference, the microcomputer 290 may not transmit the first picture quality value and the second picture quality value to the A/V transmitting device 100.

The microcomputer 290 may transmit the difference between the first picture quality value and the second picture quality value to the A/V transmitting device 100 regardless of whether the difference between the first picture quality value and the second picture quality value is greater than or equal to a preset difference.

In order to request to correct the difference between the first picture quality value and the second picture quality value, the microcomputer 290 may transmit the first picture quality value and the second picture quality value to the A/V transmitting device 100.

The processor 190 of the A/V transmitting device 100 obtains an OSD picture quality correction value based on the received first picture quality value and second picture quality value (S413).

In an embodiment, the processor 190 may obtain a picture quality correction value obtained by correcting the first picture quality value to minimize a difference between the first picture quality value and the second picture quality value. The picture quality correction value may be a difference between the first picture quality value and the second picture quality value.

For example, it is assumed that the first picture quality value of the OSD area is 50 brightness and the second picture quality value of the remaining areas is 70 brightness.

The processor 190 may obtain brightness of 20 (70−50) as a picture quality correction value.

The processor 190 of the A/V transmitting device 100 compresses the video signal, the OSD, and the picture quality correction value of the OSD, and transmits a second compressed RF packet through the RF transmitting module 150 to the A/V receiving device (200) (S415).

The microcomputer 290 of the A/V receiving device 200 restores the second compressed RF packet received from the A/V transmitting device 100 (S417).

The decoder of the microcomputer 290 may restore the received second compressed RF packet.

The microcomputer 290 of the A/V receiving device 200 outputs the video and OSD through the display 260 based on the picture quality correction value of the OSD of the restored packet (S421).

In an embodiment, the microcomputer 290 may control the picture quality value of the OSD area to be adjusted by the picture quality correction value.

For example, when the brightness of the picture quality is 20, the microcomputer 290 may control the display 260 to increase the brightness of the OSD area by 20 more than before.

When the display 290 is a liquid crystal display device, the microcomputer 290 may control a control signal to further increase the brightness by 20 to a block corresponding to an area where the OSD is to be displayed. A block is a block representing a backlight unit and may include a plurality of light sources.

When the display 260 is formed of an OLED, the microcomputer 290 may control current flowing through the plurality of LEDs corresponding to the OSD area so that the brightness of the OSD area is increased by 20 more than before. That is, the microcomputer 290 may control the current flowing through the plurality of LEDs corresponding to the OSD area to match the current flowing through the LEDs corresponding to the remaining area.

Accordingly, a difference in brightness between the OSD area and the remaining area may be minimized. The user does not recognize that the picture quality of the OSD area is changed due to the OSD.

That is, even if the OSD video is included in the content video, the user does not perceive a difference in picture quality of the OSD region, and thus may not feel inconvenience in viewing the video.

When it is determined that there is no OSD in the input video, the processor 190 of the A/V transmitting device 100 compresses the video signal and transmits a third compressed RF packet to the A/V receiving device 200 through the RF transmitting module 150 (S423).

The microcomputer 290 of the A/V receiving device 200 restores the third compressed RF packet (S425) and outputs a video included in the restored packet through the display 260 (S427).

Figure 5:
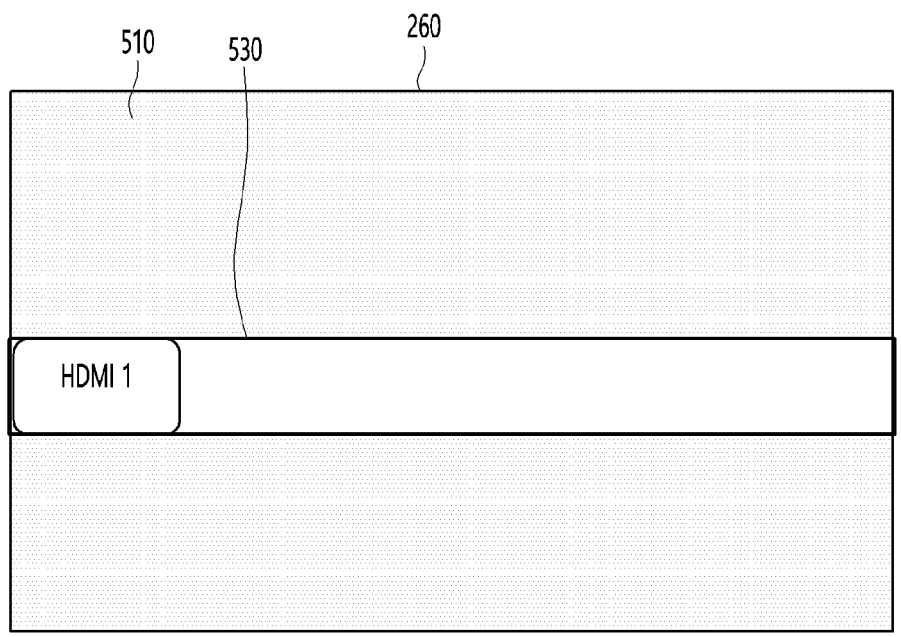
FIG. 5 is a diagram illustrating a difference in picture quality between the OSD area and the remaining area according to the prior art.

FIG. 5 is a diagram illustrating a difference in picture quality between the OSD area and the remaining area according to the prior art.

Referring to FIG. 5, a content video area 510 outputting only a content video signal and an OSD area 530 overlapping and outputting the content video signal and the OSD signal are displayed on the display 260.

When the entire video signal including the OSD is compressed and restored according to the prior art, a difference occurs between the brightness (or gradation) of the content video area 510 and the brightness (or gradation) of the OSD area 530. This is because a difference in frequency component occurs between the content video area 510 outputting only the content video signal and the OSD area 530 having the content video signal and OSD.

This will be described in more detail with reference to FIG. 6.

Figure 6:
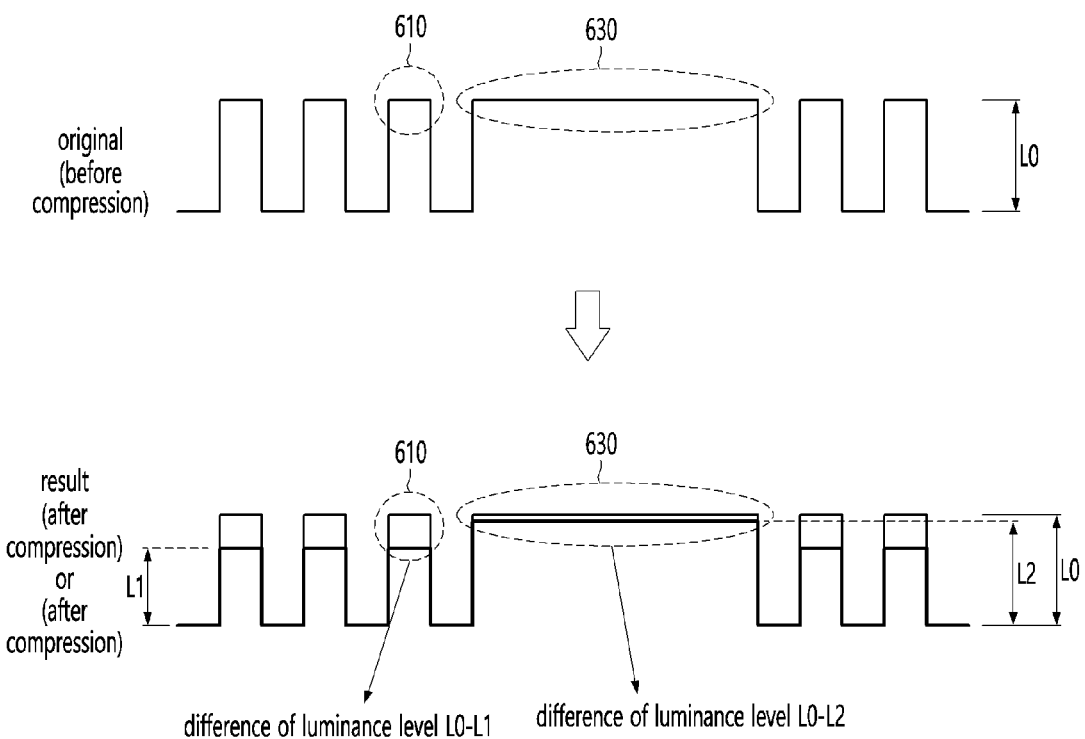
FIG. 6 is a diagram for explaining that the luminance level of the content video area and the luminance level of the OSD area are different before and after compression according to the prior art.

FIG. 6 is a diagram for explaining that the luminance level of the content video area and the luminance level of the OSD area are different before and after compression according to the prior art.

Referring to FIG. 6, in the A/V transmitting device 100, the luminance level L0 of an original video including a content video and an OSD video before compression is shown.

The content video is a one-dot pattern video in which black and white are alternately displayed on each pixel.

In FIG. 6, a luminance level is described as an example, but a brightness level or a color level may be used instead of the luminance level.

Before compression of the original video, the luminance level of the content video area 610 where only the content video is displayed and the luminance level of the OSD area 630 where the content video and the OSD are overlapped are equal to L0.

The encoder of the A/V transmitting device 100 compresses the original video in unit of line and transmits the compressed RF packet to the A/V receiving device 200.

A difference in picture quality between the content video area and the OSD area may occur during a process in which the encoder compresses the original video or in a process in which the decoder of the A/V receiving device 200 restores the compression.

This is because the lines with the OSD area are composed of low-frequency component, so that a small difference from the original occurs in the compression/restoration process. In contrast, since the content video area is composed of high-frequency component, there is a large difference from the original content video during the compression/restoration process.

The luminance level of the content video area 610 after compression or restoration may be L1, which is different from the existing L0, and the luminance level of the OSD area 630 after compression or restoration may be L2, which is not significantly different from L0.

That is, L0–L1 may have a much larger value than L0–L2.

As shown in FIG. 5, this leads to a large luminance difference between the content video area 510 and the OSD area 530, which may cause inconvenience to the user.

Figure 7:
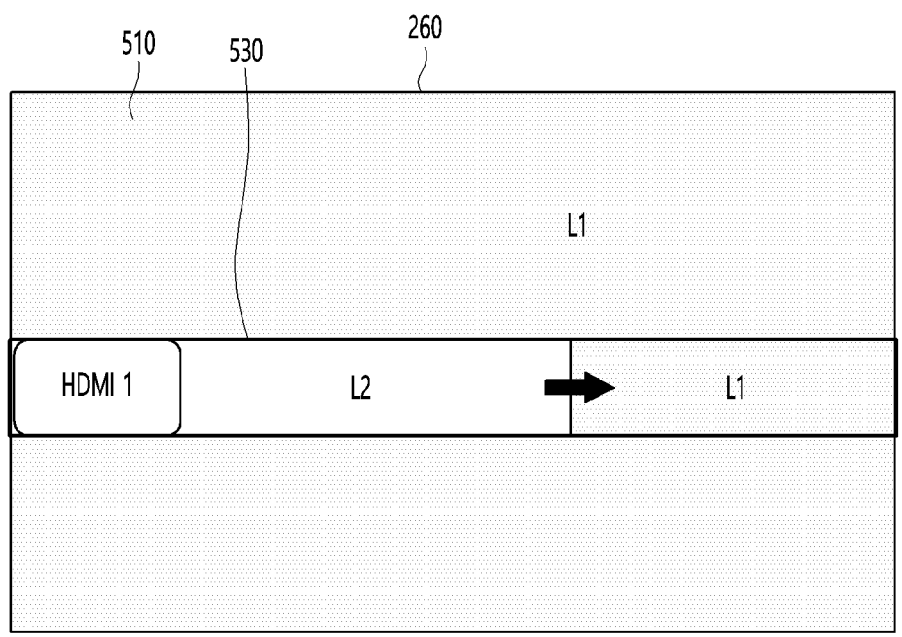
FIG. 7 is a diagram for explaining handling when a picture quality value of an OSD area is corrected according to an embodiment of the present disclosure.

FIG. 7 is a diagram for explaining handling when a picture quality value of an OSD area is corrected according to an embodiment of the present disclosure.

FIG. 7 will be described in relation to FIGS. 5 and 6.

Referring to FIG. 7, the luminance level of the content video area 510 where only the content video is displayed is L1, and the luminance level of the OSD area 530 where the content video and the OSD video are overlapped and displayed is L2.

The A/V receiving device 200 may change the luminance level L2 of the OSD area 530 to the luminance level L1 of the content video area 510. The A/V receiving device 200 may reduce the luminance level L2 of the OSD area 530 to the luminance level L1 of the content video area 510.

The A/V receiving device 200 may correct the luminance level of the OSD area 530 to the luminance level of the content video area 510 based on the coordinate information and the quality correction value of the OSD area 530 received from the A/V transmitting device 100.

Accordingly, since the luminance level of the content video area 510 and the OSD area 530 are the same, the user may not feel discomfort due to the difference in picture quality.

Figure 8:
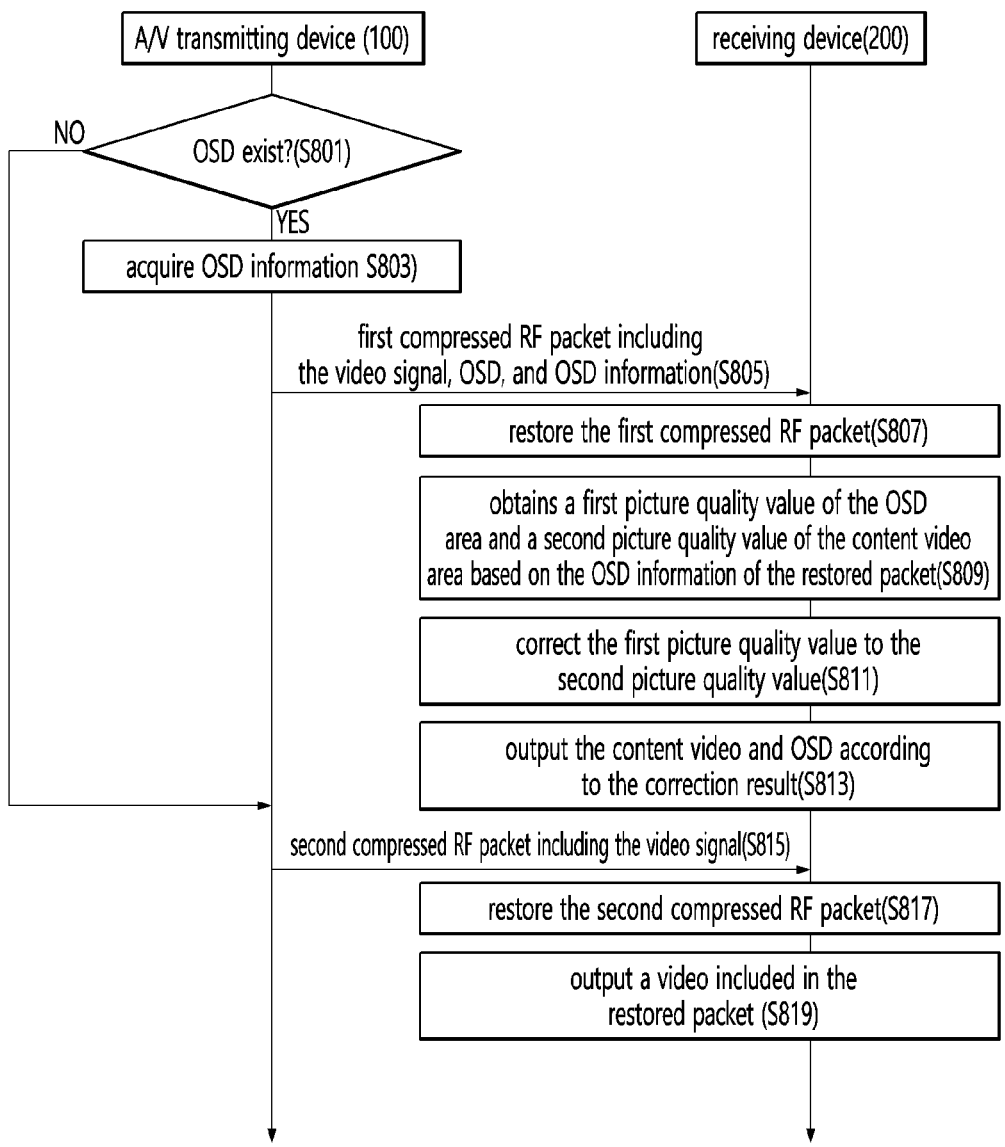
FIG. 8 is a ladder diagram for explaining a method of operating a wireless display system according to another embodiment of the present disclosure.

FIG. 8 is a ladder diagram for explaining a method of operating a wireless display system according to another embodiment of the present disclosure.

In particular, in the embodiment of FIG. 8, the A/V receiving device 200 compares the first picture quality value of the content video area with the second picture quality value of the OSD area and directly corrects the second picture quality value of the OSD area.

In FIG. 8, a detailed description of overlapping content with FIG. 4 will be omitted.

Referring to FIG. 8, the processor 190 of the A/V transmitting device 100 determines whether an OSD exists in an input video (S801).

In one embodiment, the A/V transmitting device 100 may further include an OSD generator (not shown). When the OSD is generated through the OSD generator, the processor 190 may determine that the OSD exists in the input video.

In another embodiment, the processor 190 may receive an OSD identifier indicating that an OSD is included in an externally input video from an external device. The processor 190 may determine that the OSD exists in the video input through the OSD identifier.

The processor 190 of the A/V transmitting device 100 obtains OSD information when OSD exists in the video (S803).

The OSD information may include location information indicating a location where the OSD will be displayed on the display 260. The location information of the OSD may include coordinate at which the OSD is to be displayed.

The processor 190 of the A/V transmitting device 100 compresses the video signal, OSD, and OSD information, and transmits a first compressed RF packet to the A/V receiving device 200 through the RF transmitting module 150 (S805).

The encoder of the processor 190 may compress the video signal and OSD together with OSD information to generate a first compressed RF packet.

The microcomputer 290 of the A/V receiving device 200 restores the first compressed RF packet received from the A/V transmitting device 100 (S807).

The decoder of the microcomputer 290 may restore the received first compressed RF packet.

The microcomputer 290 of the A/V receiving device 200 obtains a first picture quality value of the OSD area and a second picture quality value of the content video area other than the OSD area based on the OSD information of the restored packet (S809).

The first picture quality value of the OSD area may indicate the value of the picture quality factor of the area where the OSD is displayed.

The remaining area other than the OSD area may be a content video area in which only content videos are displayed.

The second picture quality value of the remaining area may indicate a picture quality factor value measured in the remaining area other than the OSD area.

The quality factor may be any one of luminance, brightness, and gradation.

The microcomputer 290 may measure a brightness value or gradation value of an OSD area where the OSD is displayed among the entire area of the display 260 based on OSD location information included in the OSD information.

In addition, the microcomputer 290 may measure brightness value or gradation value of the remaining area other than the OSD area.

The microcomputer 290 of the A/V receiving device 200 corrects the first picture quality value to the second picture quality value (S811).

In an embodiment, the microcomputer 290 may correct the first picture quality value to the second picture quality value when a difference between the first picture quality value and the second picture quality value is greater than or equal to a preset difference.

For example, when the luminance of the content video area is 10 and the luminance of the OSD area is 90, the microcomputer 290 can correct the luminance of the OSD area to 10.

To this end, the microcomputer 290 may control the display 260 so that the luminance of the OSD area becomes 10. Specifically, when the display 260 is formed of an OLED, current flowing through a plurality of pixels corresponding to the OSD area may be controlled so that the luminance of the OSD area becomes 10.

When the display 260 is a liquid crystal display (LCD), the microcomputer 290 may control the backlight unit block corresponding to the OSD area so that the luminance becomes 10.

If the difference between the first picture quality value and the second picture quality value is less than a predetermined difference, the microcomputer 290 may not correct the first picture quality value.

The microcomputer 290 may correct the first picture quality value to the second picture quality value regardless of whether the difference between the first picture quality value and the second picture quality value is greater than or equal to a preset difference.

The processor 190 of the A/V transmitting device 100 outputs the content video and OSD through the display 260 according to the correction result (S813).

When it is determined that there is no OSD in the input video, the processor 190 of the A/V transmitting device 100 compresses the video signal and transmits a third compressed RF packet to the A/V receiving device 200 through the RF transmitting module 150.

The microcomputer 290 of the A/V receiving device 200 restores the second compressed RF packet (S817) and outputs a video included in the restored packet through the display 260 (S819).

Figure 9:
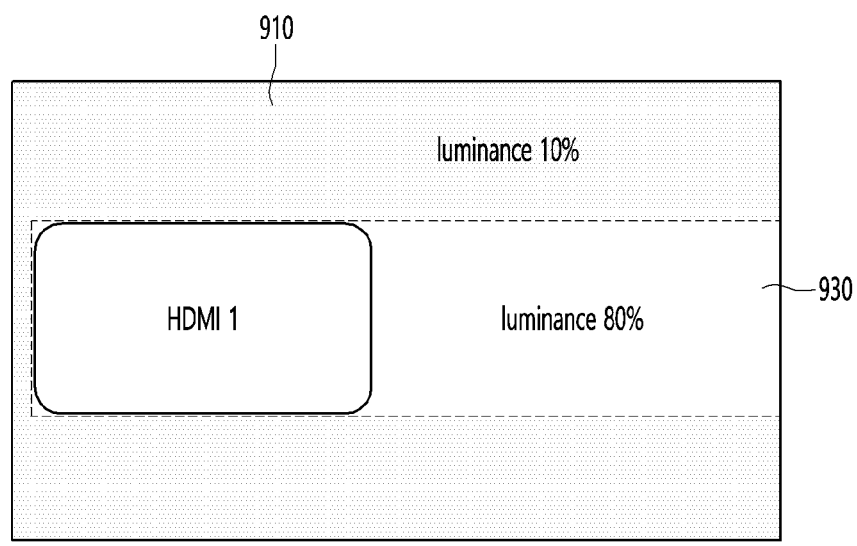
FIGS. 9 and 10 are diagrams for explaining a method of determining whether an embodiment of the present disclosure is applied to a wireless display system.
Figure 10:
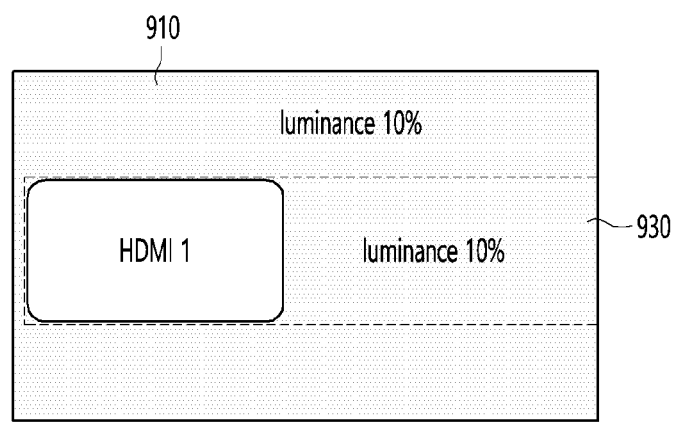

FIGS. 9 and 10 are diagrams for explaining a method of determining whether an embodiment of the present disclosure is applied to a wireless display system.

FIGS. 9 and 10, it is assumed that the same video pattern is input to each of the horizontal lines on which the OSD is displayed. The video pattern may be a one-dot pattern.

An embodiment of the present disclosure is the embodiment of FIGS. 4 and 8 in which a picture quality value (here, a luminance value) of an OSD area is corrected with a picture quality value of a content video area.

Referring to FIG. 9, when the embodiment of the present disclosure is not applied, the luminance value (10%) of the content video area 910 displaying the content video and the luminance value (80%) of the OSD area 930 displaying the OSD) is different from each other. This is because the luminance of the OSD area 930 is not corrected.

Referring to FIG. 10, when the embodiment of the present disclosure is applied, the luminance value (10%) of the OSD area 930 may be the same as the luminance value (10%) of the content video area 910.

That is, when the embodiment of the present disclosure is applied, the luminance value of the OSD area 930 may be corrected to be the same as the luminance value of the content video area 930.

The microcomputer 290 or the luminance measuring device of the A/V receiving device 200 may measure the luminance value of the content video area 910 and the luminance value of the OSD area 930, respectively.

When each measured luminance value is the same, it can be confirmed that the embodiment of the present disclosure is applied.

In another embodiment, since a minute error may occur, even if the difference between the luminance value of the content video area 910 and the luminance value of the OSD area 930 is minute (error range 1-3%), it may be confirmed that an embodiment of the present disclosure is applied.

Figure 11:
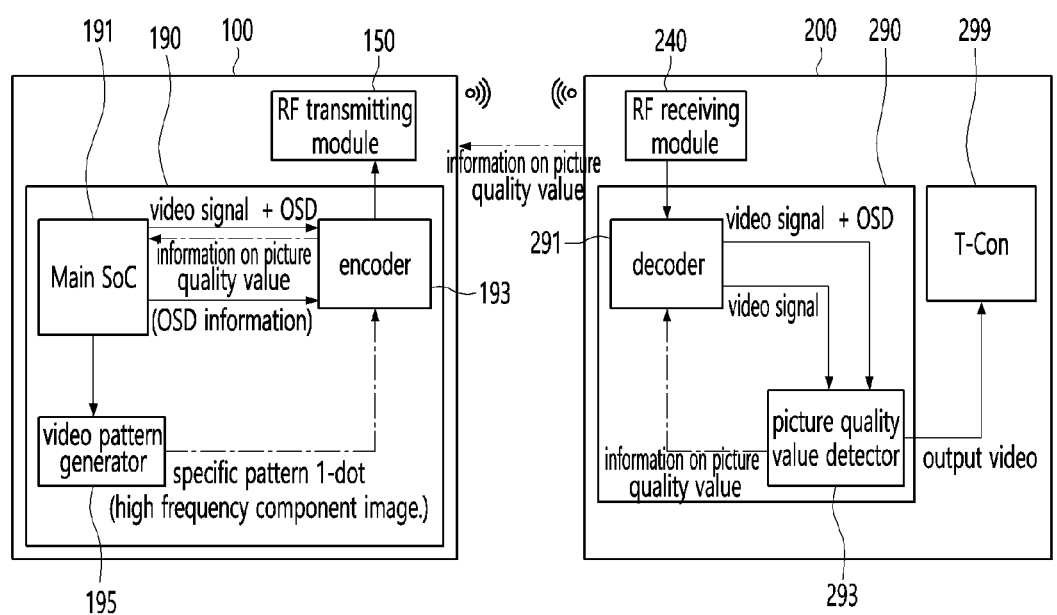
FIG. 11 is a diagram illustrating a detailed configuration of a wireless display system according to an embodiment of the present disclosure.

FIG. 11 is a diagram illustrating a detailed configuration of a wireless display system according to an embodiment of the present disclosure.

Referring to FIG. 11, the processor 190 of the A/V transmitting device 100 may include a main Soc 191, an encoder 193, and a video pattern generator 195.

The main Soc 191 may deliver a video signal and an OSD corresponding to the content video to the encoder 193.

The main Soc 191 may additionally transfer OSD information to the encoder 193 in addition to the video signal and the OSD.

The video signal may be a signal having a high frequency component, and the OSD may be a video signal having a low frequency component.

The encoder 193 may compress video signal, OSD and OSD information. The encoder 193 may generate a compressed RF packet through color sampling and transmit the generated RF packet to the RF transmitting module 150.

The RF transmitting module 150 may transmit the compressed RF packet to the RF receiving module 240 of the A/V receiving device 200.

The video pattern generator 195 may generate a video pattern having a high frequency component. A video pattern having a high frequency component may be a one-dot pattern.

A one-dot pattern may be generated to use whether an embodiment of the present disclosure is applied.

The video pattern generator 195 may transmit the generated video pattern to the encoder 193.

The microcomputer 290 of the A/V receiving device 200 may include a decoder 291 and a picture quality value detector 293.

The decoder 291 may restore the RF packet received by the RF receiving module 240.

The decoder 291 may restore the video signal, OSD, and OSD information included in the compressed RF packet.

The picture quality value detector 291 may detect a first picture quality value of an OSD area where the restored video signal and OSD overlap, and a second picture quality value of a content video area where the video signal is displayed.

The picture quality value detector 291 may extract an OSD area based on the OSD information and detect a first picture quality value of the extracted OSD area.

The picture quality value detector 291 may detect a second picture quality value of a content video area other than the OSD.

The quality value may include one or more of luminance, brightness, and gradation.

The picture quality value detector 293 may transmit picture quality value information including a first picture quality value and a second picture quality value to the decoder 291.

The picture quality value detector 293 may output the video signal and the OSD restored through the decoder 291 to the timing controller 299.

The RF receiving module 240 may transmit quality value information to the RF transmitting module 150.

Quality value information may be fed back to the A/V transmitting device 100.

The main Soc 191 may acquire a picture quality correction value of the OSD area based on the received picture quality value information.

The main Soc 191 may correct the first picture quality value of the OSD area to the second picture quality value of the content video area.

Specifically, the main Soc 191 may correct the quality value of the OSD area after compression to the quality value of the content video area after compression. That is, the corrected picture quality value of the OSD region may be delivered to the A/V receiving device 200.

Accordingly, the quality value of the OSD area and the quality value of the content video area may be equal to each other.

In this way, according to an embodiment of the present disclosure, the problem of a difference in picture quality between a content video area displaying only a content video and an OSD area displaying an overlapping content video and OSD can be solved.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The A/V transmitting device described above is not limited to the configuration and method of the above-described embodiments, but all or part of each embodiment is selectively combined so that various modifications can be made.

The invention claimed is:

1. An A/V (Audio/Video) receiving device, comprising:
    a display;
    a RF receiving module configured to receive a compressed Radio Frequency (RF) packet from an A/V transmitting device, wherein the compressed RF packet includes a video signal corresponding to a content video, OSD (On Screen Display), and OSD information; and
    a microcomputer configured to:
    based on the OSD information, obtain a picture quality value information including a first picture quality value of an OSD area where the OSD is displayed and a second picture quality value of a content video area where only the content video is displayed is obtained,
    transmit the picture quality value information to the A/V transmitting device,
    receive a picture quality correction value in which the first picture quality value of the OSD area is corrected from the A/V transmitting device, and
    output the content video and the OSD through the display based on the received picture quality correction value.

2. The device of claim 1, wherein the picture quality correction value is the same as the second picture quality value.

3. The device of claim 1, wherein each of the first picture quality value and the second picture quality value represents one of luminance, brightness, and gradation.

4. The device of claim 1, wherein the OSD information includes location information of the OSD indicating a location where the OSD will be displayed on the display,
    wherein the microcomputer is further configured to:
    measure the first picture quality value of the OSD area and the second picture quality value of the content video area based on the location information.

5. The device of claim 1, wherein the video signal is a signal having a high frequency component, and the OSD is a signal having a low frequency component.

6. The device of claim 1, wherein the microcomputer is further configured to:
    transmit the picture quality value information to the A/V transmitting device when the difference between the first picture quality value and the second picture quality value is greater than or equal to a preset difference.

7. The device of claim 1, wherein the microcomputer is configured to transmit the quality value information to the A/V transmitting device regardless of a difference between the first picture quality value and the second picture quality value.

8. A wireless display system, comprising:
    An A/V (Audio/Video) transmitting device configured to:
    generate an RF packet,
    compress the generated RF packet, and
    transmit the compressed RF packet to an A/V receiving device through a RF communication, wherein the compressed RF packet includes a video signal corresponding to the content video, On Screen Display (OSD) and OSD information; and
    the A/V receiving device configured to:
    based on the OSD information, obtain a picture quality value information including a first picture quality value of an OSD area where the OSD is displayed and a second picture quality value of a content video area where only the content video is displayed is obtained,
    transmit the picture quality value information to the A/V transmitting device,
    receive a picture quality correction value in which the first picture quality value of the OSD area is corrected from the A/V transmitting device, and
    output the content video and the OSD through the display based on the received picture quality correction value.

9. The system of claim 8, wherein the picture quality correction value is the same as the second picture quality value.

10. The system of claim 8, wherein each of the first picture quality value and the second picture quality value represents one of luminance, brightness, and gradation.

11. The system of claim 8, wherein the OSD information includes location information of the OSD indicating a location where the OSD will be displayed on the display,
    wherein the A/V receiving device is further configured to:
    measure the first picture quality value of the OSD area and the second picture quality value of the content video area based on the location information.

12. The system of claim 8, wherein the video signal is a signal having a high frequency component, and the OSD is a signal having a low frequency component.

13. The system of claim 8, wherein the A/V receiving device is further configured to:
    transmit the picture quality value information to the A/V transmitting device when the difference between the first picture quality value and the second picture quality value is greater than or equal to a preset difference.

14. The system of claim 8, wherein the A/V receiving device is configured to transmit the quality value information to the A/V transmitting device regardless of a difference between the first picture quality value and the second picture quality value.

15. The system of claim 8, wherein the A/V transmitting device is further configured to obtain the second picture quality value of the content video area as the picture quality correction value based on the picture quality value information received from the A/V receiving device.

* * * * *